United States Patent

[11] 3,564,252

| [72] | Inventor | Paul E. Stoft<br>Menlo Park, Calif. |
| --- | --- | --- |
| [21] | Appl. No. | 802,338 |
| [22] | Filed | Feb. 26, 1969 |
| [45] | Patented | Feb. 16, 1971 |
| [73] | Assignee | Hewlett-Packard Company<br>Palo Alto, Calif.<br>a corporation of California |

[54] RADIOMETER FOR MEASURING POWER ON AN ABSOLUTE BASIS
6 Claims, 4 Drawing Figs.

| [52] | U.S. Cl. | 250/83.3,<br>73/355 |
| --- | --- | --- |
| [51] | Int. Cl. | G01j 5/10 |
| [50] | Field of Search | 250/83.39R<br>73/355 |

[56] References Cited
UNITED STATES PATENTS

| 3,222,522 | 12/1965 | Birkebak | 250/83.3IR |
| --- | --- | --- | --- |
| 3,401,263 | 9/1968 | Birkebak | 250/83.3IR |
| 3,498,132 | 3/1970 | Smith et al. | 250/83.3IR |

*Primary Examiner*—Archie R. Borchelt
*Attorney*—Stephen P. Fox

ABSTRACT: There are provided two integrating spheres having the same configuration. One of the integrating spheres is heated by incident radiation collected from an outside energy source of unknown power. The second sphere is heated resistively to the same temperature attained by the first sphere. The electrical heating of the second sphere is controlled by a servo loop activated from a single detector which alternately senses thermal radiation from the two spheres. Electrical power delivered to the heating element in the second sphere is measured by a power meter and directly equals the radiative power incident in the first sphere.

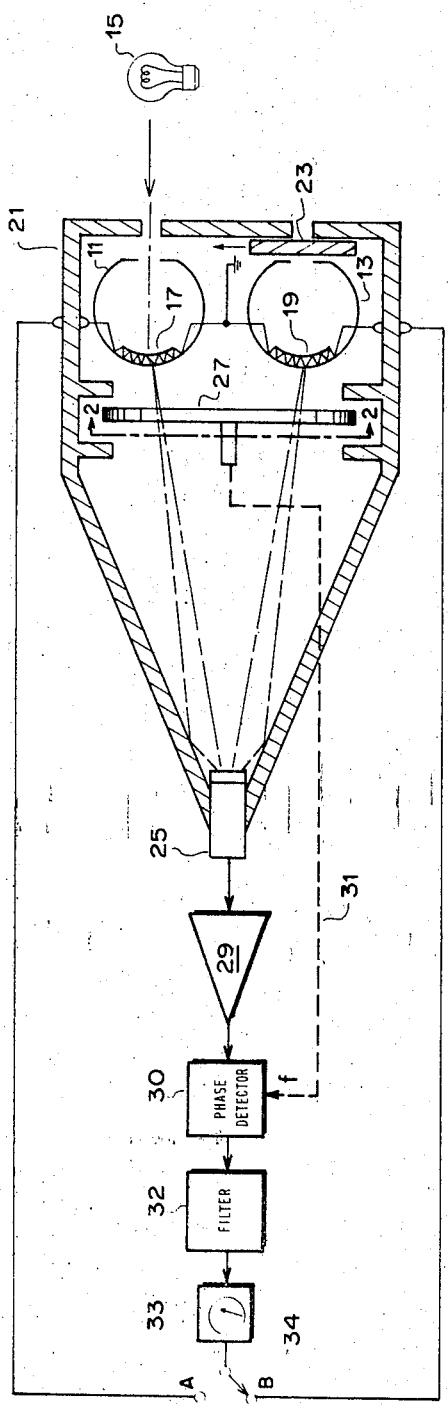
Figure 1
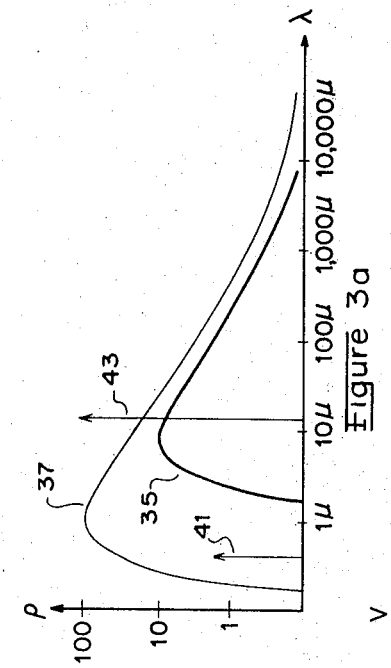
Figure 3a
Figure 3b
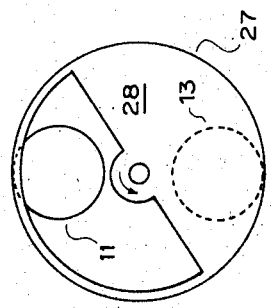
Figure 2
INVENTOR.
PAUL E. STOFT

RADIOMETER FOR MEASURING POWER ON AN ABSOLUTE BASIS

BACKGROUND OF THE INVENTION

Preferably, measurement of radiated power from an unknown energy source should be on an absolute basis and have a high degree of accuracy. Difficulties have been encountered in making a radiative power measuring instrument which covers the ultraviolet to infrared regions and is stable, precise and accurate. Present instruments employing thermocouples typically have spectral response curves which are not flat. The output of such devices must be calibrated against standard light bulbs or other inaccurate standards. Preferably the radiation measuring instrument should have a uniform response over a broad spectral range without unstable characteristics that necessitate frequent calibration of the instruments.

SUMMARY OF THE INVENTION

The illustrated embodiment of the present invention includes two integrating spheres, one of which collects and absorbs incident radiation of any wavelength distribution from an energy source of unknown power and transforms this radiation into black-body thermal radiation. The other integrating sphere, having the same external thermal emissivity characteristics as the first sphere, acts as a reference source of black-body thermal radiation and is heated by an electrical element. The thermal radiation emitted by the two integrating spheres is alternately interrupted by a chopper wheel and is directed to a single detector. The detector produces an output signal having two components corresponding to the magnitudes of thermal radiation from the two integrating spheres. The difference between the signal components is amplified and used to control the electrical heating element of the reference-integrating sphere. When thermal radiation from the two spheres is equalized, the electrical power input to the heating element is an absolute indication of the incident power from the unknown energy source.

Accurate optical power measurements can be made if the total incident-radiated power of the unknown source is captured by the sphere or if both the power density of the incident radiation and the inlet aperture of the sphere are known. Since both the electrical energy input to the heating element and the incident-radiative power from the unknown source result in equal temperature rises of the integrating spheres, absolute power measurement can be made for any wavelength distribution of the source. The integrating spheres in the system provide a calorimetric standard and a response that is flat with wavelength over a very broad spectral range. Long term stability is achieved because of the stable thermal emissivity of the outside surface of the integrating spheres. The single detector used may be any one that is sensitive to the small differential temperature rises of the spheres. The spectral sensitivity, absolute accuracy, and stability of the detector are inconsequential.

Both integrating spheres are made identical so that either may be heated electrically and/or optically. The roles of the two spheres may be interchanged to check the symmetry of the system and thereby to enhance the accuracy of the power measurement. In addition, the two integrating chambers may simultaneously receive incident radiation from two separate sources, thereby permitting differential analysis of the power from the two sources.

BRIEF DESCRIPTION OF THE DRAWINGS

FIG. 1 is a combined schematic diagram and cross-sectional view of one embodiment of the invention.

FIG. 2 is an end view of the chopper wheel taken along line 2–2 of FIG. 1.

FIG. 3 a is a graph illustrating different radiation curves including several typical laser radiation characteristics.

FIG. 3 b is a graph illustrating the spectral sensitivity of a typical thermocouple detector that may be used in the present invention.

DESCRIPTION OF THE PREFERRED EMBODIMENT

Referring now to FIG. 1, there are shown two adjacently disposed integrating chambers or spheres 11 and 13, each of which has an apertured portion for receiving incident radiation from an energy source of unknown power output to be measured. The energy source is exemplified by a tungsten filament lamp 15; however, the present invention comprehends the power measurement of other energy sources which emit radiation having different wavelength distributions, as will become apparent from the description hereinafter. The integrating spheres are blackened on the interior and exterior surfaces thereof, so that incident radiation collected thereby is absorbed and transformed into radiation having the wavelength distribution of a black-body radiator. Integrating sphere 13 is configured the same as integrating sphere 11 and serves as a reference source of radiation—.

Thermal energy is supplied to the integrating spheres by electrical resistance heating element 17, 19 which are positioned (as viewed in the drawing) on the left-hand interior surface portions of integrating spheres 11, 13 respectively, upon which incident radiation first impinges. The elements 17, 19 are selectively energized by a controllable power source, hereinafter described.

An isothermal housing or enclosure 21 surrounds the integrating spheres 11, 13 to maintain the environment thereof at a constant temperature. The enclosure 21 has a pair of apertures aligned with the radiation inlet apertures of the integrating spheres. A shutter or slidable blocking member 23 is movable to permit incident radiation to enter either one or both of the two apertures for purposes hereinafter described. The enclosure 21 also has two converging and reflecting sidewall portions for directing thermal radiation from integrating spheres 11, 13 along converging paths of travel, as indicated by the dashed lines, to a single detector.

Disposed within enclosure 21, between the integrating spheres 11, 13 and a detector 25, is a means for exposing the detector alternately to thermal radiation from each integrating sphere. In the illustrated embodiment of the invention the alternate exposing means is a chopper wheel 27 which is rotated by a motor (not shown) at a predetermined speed, for example 15 Hertz.

As illustrated in FIG. 2, the chopper wheel 27 has a semicircular thermally opaque solid portion 28 for obstructing radiation from one of the two spheres and a cutout portion permitting transmission of thermal radiation from the other sphere.

Detector 25 may be a radiant-energy sensor such as the improved thermopile disclosed in U.S. application Ser. No. 613,289 filed Feb. 1 1967 and assigned to the same assignee as the present invention. The detector produces a pulsating electrical output signal having two different components proportional to the magnitude of thermal radiation from the two integrating spheres 11, 13 respectively. The detector output is amplified by an amplifier 29 and then detected by a phase-sensitive detector circuit 30. The synchronizing signal for the phase-sensitive detector circuit may be derived from a commutator (not shown), which is mechanically linked to the chopper wheel 27 and which has an electrical output connected to the phase-sensitive detector circuit 30 as suggested by the dashed line 31.

The phase-sensitive detector 30 produces output power which is proportional to the difference between the two signal components received by detector 25. The output of the phase-sensitive detector is filtered (and/or integrated) by a filter circuit 32 and fed through a power meter 33 and a switch 34 to one or the other of the heating elements 17, 19 in the integrating spheres. The filter 32 narrows the bandwidth of the phase-sensitive detector output and helps to provide a high signal-to-noise ratio. The power meter 33 measure the power delivered to the heating element, and the power reading obtained is equal to the incident-radiative power from the unknown source 15, as described hereinafter.

If the incident radiation from source 15 produces a high temperature in integrating sphere 11, sphere 13 should be heated and, therefore, switch 34 will be in position B, as shown in FIG. 1. If the filter following the phase-sensitive detector is not an integrator, the high gain of the amplifier 29 causes integrating sphere 13 to be heated so that the steady state temperatures of both integrating spheres is within a few millionths of a degree. If a true integrator is used, then the temperature differential can be held to zero. If sphere 11 is exposed to a low temperature body, this sphere may be heated by moving switch 33 to position A. In this case the power meter registers the power radiated by the integrating sphere 11 to the cold body, and thus indicates the heat absorption characteristics of the cold body.

The roles of the two integrating spheres may be reversed by sliding the shutter member 23 so that incident radiation from source 15 is blocked from spheres 11 but is received by sphere 13. In this situation, switch 34 is moved to position A to turn off heating element 19, and permit energization of the other heating element 17.

Symmetrical operation may be achieved by moving the shutter member 23 to block radiation from one or the other of the two integrating spheres 11, 13 and moving switch 34 into one or the other of its opposite positions. With this arrangement, any asymmetries in the spectral emissivities of integrating spheres 11, 13 readily become apparent and can be eliminated by compensatory adjustments in the input power to each integrating sphere. Additionally, if blocking member 23 is positioned between the two radiation inlets to housing 21, the integrating spheres 11, 13 may receive radiation from two separate sources through suitable ducting means (not shown) and the thermal energy from the two sources may be differentially measured and compared.

As noted hereinabove, the exterior surfaces of integrating spheres 11, 13 are blackened so that the spheres act as blackbody radiators. Thermal radiation from a black-body source is centered at a wavelength $\lambda$ which is a function of operating temperature, in accordance with the following mathematical expression:

$$\lambda = \frac{2883.6}{T}$$

where T is measured in degrees Kelvin and $\lambda$ is given in microns. Assuming that the isothermal housing 21 maintains the environment of integrating spheres 11, 13 somewhat above ambient room temperature, for example 50° C, the thermal radiation of sphere 11 will be maximum at a wavelength of 9 microns ($\mu$). This is indicated by the curve 35 in FIG. 3 a which illustrates the distribution of radiated power P as a function of wavelength $\lambda$. Integrating sphere 13 has a radiation distribution curve identical with that of sphere 11. The detector system measures only the incremental differences in radiation between the two identical integrating spheres so that the measurement is independent of ambient temperature.

In FIG. 3 a the curve 37 represent an energy distribution curve for a source of radiated power that may be measured. When radiation from this source impinges upon an integrating sphere, it is heated to thereby produce thermal energy having the black-body energy distribution of curve 35. Also, radiated energy from ultraviolet or infrared laser sources, corresponding respectively to the spectral lines 41, 43, will similarly heat or cool the integrating sphere. It can be seen that regardless of the energy distribution of the radiated power, when it impinges upon one of the integrating spheres, it is transformed into thermal energy having the thermal energy distribution of curve 35. The curve 35 may be shifted slightly to the left or right due to variations in the ambient temperature within the housing 21; however, this does not effect the measurement accuracy because only the difference in radiation between the two spheres is measured, as noted hereinabove.

FIG. 3 b illustrates one possible sensitivity curve for thermal radiation detector 25. As shown, the detector sensitivity is not constant as a function of the wavelength of the radiation impinging thereon. It is preferable that the spectral sensitivity curve of the detector overlap as much of the radiosity curve of the integrating sphere as possible so that high sensitivity may be achieved. As the sensitivity of any detector increases with decreasing temperature, cooling of the chamber may be highly desirable. Because the measurement is calorimetric, the accuracy will be maintained as long as the integrating spheres appear to be totally black to the incident energy. It is also important to note that the back radiating surfaces of the integrating spheres do not need to be ideal black bodies as long as they are identical—.

It can be seen that the measurement of radiated power from an unknown energy source is not affected by the wavelength distribution thereof. Consequently, the power-measuring system of the present invention need not be calibrated on the basis of the wavelength of the incident radiation, and power measurement is very accurate even though the energy radiated by an unknown source is distributed over a broad spectrum.

I claim:

1. Apparatus for measuring the absolute power of unknown energy sources over a broad range of wavelengths comprising:

first and second adjacently disposed thermal chamber means respectively having external surface portions for emitting thermal radiation along converging paths of travel, said first chamber means being responsive to energy received from a power source to be measured;

means providing a reference source of thermal energy within said second thermal chamber means;

isothermal housing means for maintaining said two thermal chamber means in a constant temperature environment;

thermal radiation detector means disposed within said isothermal housing means for receiving thermal radiation along said converging paths of travel from said two thermal chamber means;

means positioned between said thermal radiation detector means and said two thermal chamber means for alternately exposing said detector means to thermal radiation from said two thermal chamber means;

means synchronized with said alternate exposing means and responsive to said thermal radiation detector means for controlling the power input to said means providing a reference source of thermal energy to equalize thermal radiation from said two thermal chamber means; and means for indicating the power supplied to said reference source of known thermal energy.

2. The apparatus of claim 1:

said means providing a reference source of thermal energy including an electrical resistance heating element disposed within said second thermal chamber means;

said means for controlling the power input to said means providing a reference source of thermal energy including amplifier means having an electrical output for energizing said electrical resistance heating element proportionately to the difference in thermal energy radiated by said two thermal chamber means; and said means for indicating the power supplied to said reference source of thermal energy including a power meter response to the output of said amplifier means.

3. A device for accurately measuring radiated power from an unknown energy source comprising;

first integrating chamber means including an inlet portion for receiving incident radiation from said unknown energy source to produce thermal radiation directed along a first path of travel;

second integrating chamber means disposed adjacent to said second integrating chamber means and including electrical heating means for producing thermal radiation directed along a second path of travel;

isothermal housing means for maintaining said first and second integrating chamber means in a constant temperature environment;

mechanical means disposed adjacent to said first and second integrating chamber means for alternately interrupting said first and second paths of thermal radiation;

single detector means for receiving said alternately interrupted paths of thermal radiation from said first and second integrating chamber means, said detector means producing an output signal having first and second components indicative of thermal radiation from said unknown energy source and said electrical heating means, respectively;

phase-sensitive detector means synchronized with said mechanical alternate interrupting means and responsive to said single thermal radiation detector means for producing DC output power proportional in magnitude to the difference between said first and second signal components from said detector;

means for connecting the output power from said phase-sensitive detector means to said electrical heating means; and means for measuring the output power from said phase-sensitive detector means to indicate the radiated power from said unknown energy source directly and absolutely.

4. The radiated power measuring device of claim 3:

said first integrating chamber means also including electrical heating means for producing thermal radiation directed along said first path of travel;

said second integrating chamber means also including an inlet portion for receiving incident radiation; and said isothermal housing means including two window portions respectively aligned with the inlet portions of said first and second integrating chamber means.

5. The device of claim 4, further including:

movable shutter means for selectively blocking said two window portions to permit absorption of incident radiation by either one or both of said first and second integrating chamber means; and switch means for coupling output power from said phase-sensitive detector means to the electrical heating means of either said first or second integrating chamber means.

6. The power measuring device of claim 3, said mechanical alternate interrupting means including rotatable chopper wheel means having first and second portions for respectively obstructing and transmitting thermal radiation.